United States Patent [19] [11] 4,102,719
Fujii et al. [45] Jul. 25, 1978

[54] PROCESS FOR PRODUCING ARTIFICIAL LEATHER

[75] Inventors: Sadao Fujii; Hidehiko Maki, both of Kyoto; Toru Orisaka, Uji; Shoji Matsuda; Koichi Nishida, both of Kyoto; Tamio Ishiai; Tasaku Nishii, both of Wakayama; Yuichi Ueda, Osaka, all of Japan

[73] Assignees: Dynic Corporation, Kyoto; Kao Soap Co., Ltd., both of Japan

[21] Appl. No.: 705,514

[22] Filed: Jul. 15, 1976

[30] Foreign Application Priority Data

Dec. 20, 1975 [JP] Japan .................... 50-152460

[51] Int. Cl.² ............ B29D 27/04; B32B 5/20; B32B 31/14
[52] U.S. Cl. ................... 156/78; 156/231; 156/246; 156/324; 428/151; 428/160; 428/425; 428/904
[58] Field of Search .......... 156/61, 77, 78, 79, 156/231, 246, 247, 249, 301, 311, 324, 555; 428/904, 151, 160, 423–425

[56] References Cited

U.S. PATENT DOCUMENTS

| | | |
|---|---|---|
| 3,708,333 | 1/1973 | Carlson ................... 428/904 |
| 3,793,102 | 2/1974 | Day ................... 156/247 X |
| 3,861,937 | 1/1975 | Hanneken et al. ........ 156/247 X |
| 3,933,548 | 1/1976 | Anderson et al. ........ 156/246 X |
| 3,939,021 | 2/1976 | Nishibayashi ............ 156/239 X |
| 3,959,049 | 5/1976 | Tanaka et al. ........... 156/246 X |

FOREIGN PATENT DOCUMENTS 22,806 2/1976 Japan.

*Primary Examiner*—William A. Powell
*Assistant Examiner*—John E. Kittle
*Attorney, Agent, or Firm*—Birch, Stewart, Kolasch and Birch

[57] ABSTRACT

A process for producing an artificial leather having excellent touch, appearance and full-hand similar to that of natural leather and having further excellent softness and surface strength, which comprises coating a composition comprising an urethane prepolymer, a combination of catalysts and a foam stabilizer and including a plurality of extremely fine cells (foams) of an inert gas, onto a release paper or a layer of a surface treating agent coated on a release paper in a specified thickness; subjecting the resultant to a steam treatment under a specified atmosphere; laminating a base sheet onto the coating layer under pressure; subjecting the laminated product to a heat treatment at a specified temperature, and then peeling off the release paper, and optionally further treating the product with a surface treating agent.

10 Claims, No Drawings

PROCESS FOR PRODUCING ARTIFICIAL LEATHER

BACKGROUND AND SUMMARY OF THE INVENTION

The present invention relates to a process for producing an artificial leather. More particularly, it relates to a process for efficiently producing an artificial leather having an expanded polyurethane layer including fine foams, which has an excellent touch, appearance and a full-hand similar to that of natural leather and further has an excellent softness and an excellent surface strength.

Artificial leather is usually produced from various synthetic resins, such as urethane resins, amino acid resins, acrylic resins and nylon resins, by a dry process or a wet process. However, conventional artificial leather is inferior to natural leather in physical properties and touch. Moreover, the conventional process has some defects, such as a difficulty in the control of the conditions in the production steps. Also, certain environmental pollution problems are produced because harmful solvents are used.

It has been proposed to produce artificial leather from an expanded polyurethane produced by contacting an urethane prepolymer having a terminal isocyanate group (hereinafter, referred to as "urethane prepolymer") with moisture and an organic substance having an activated hydrogen, because the expanded polyurethane layer has a similar touch to that of the natural leather. However, it is generally very difficult to prepare a composition comprising as the essential component a urethane prepolymer. And, even if the composition can be prepared, when an artificial leather is produced from the composition, the leather has an inferior surface strength, and further, it is technically difficult to produce the optimum thick touch to the artificial leather. Thus, nobody has succeeded in the production of an artificial leather having excellent touch, full-hand, etc., similar to that of natural leather by using a urethane prepolymer.

The present inventors have now found a process for producing an artificial leather similar to natural leather by using a urethane prepolymer, i.e. by preparing a composition containing the urethane prepolymer wherein an appropriate catalyst, foam stabilizer, colorant, filler or the like are incorporated (no solvent is used), coating the composition thus prepared onto a release paper, laminating a base sheet onto the coating layer, and then foaming and resinifying the composition at a constant foaming ratio (Japanese Patent laid Open publication (without examination) No. 35301/1975 and Japanese Patent Application No. 95813/1974). The artificial leather produced by this process has excellent properties, but the process has still some defects in the stability and efficiency of the production.

As the results of the present inventors' further extensive studies, it has been found that the desired artificial leather similar to the natural leather can be constantly and efficiently produced by using a combination of an amine catalyst and a metallic catalyst and carrying out the process by two stage reactions, i.e. by proceeding previously with the foaming reaction, laminating the base sheet thereon, providing a pressure until the foaming layer achieves a fixed thickness and then heating the resultant composite, whereby the aging step necessary in the conventional process can be omitted.

An object of the present invention is provide a process for producing an artificial leather having an expanded polyurethane layer including fine foams and having excellent touch, appearance and full-hand similar to those of natural leather and having excellent softness and surface strength.

Another object of the present invention is to provide an improved process for producing an artificial leather by using a combination of an amine catalyst and a metallic catalyst and controlling the reaction conditions so that the expansion ratio of the urethane prepolymer is maintained in a fixed range.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the artificial leather is produced as follows:

Firstly, a composition comprising as the essential component an urethane prepolymer is prepared by admixing a catalyst, a foam stabilizer, and optionally other additives, to the urethane prepolymer which is liquid at room temperature and is prepared from a polyol and an organic polyisocyanate in a ratio of the isocyanate group equivalent [NCO] to the hydroxy group equivalent [OH] of 2.0 to 4.0, and then admixing thereto an inert gas so that plenty of extremely fine cells (foams) are included in the compound and agitating the mixture. The composition thus prepared is then coated onto a release paper, or onto a layer of a surface treating agent coated on the release paper, in a thickness of 0.03 to 0.5 mm, and the resultant is expanded in an atmosphere of a temperature of 40° to 95° C (dry-bulb thermometer) and a humidity of 60% or more (relative humidity) so that the number of the foams (fine cells) in the coating (foaming) layer becomes 5,000 forms/inch$^2$ or more and the density of the coating layer becomes 80 – 700 g/liter and is simultaneously resinified so that the coating layer becomes semi-solid, the surface of which has enough tack. Thereafter, onto the coating layer is laminated a base sheet under a pressure so that the thickness of the coating layer becomes about 0.95 to 0.4 times that before the laminating of the base sheet, and the resultant product is sufficiently reacted by heating at a temperature of 90° to 180° C, and thereafter, the release paper is peeled off. When the composition is directly coated on the release paper (i.e. not on the layer of the surface treating agent coated thereon), the leather obtained above may optionally be treated with a surface treating agent.

According to a suitable embodiment of the present invention, the composition comprises, as the essential component thereof, the urethane prepolymer, wherein an inert gas is incorporated, which is coated onto a release paper or a layer of a surface treating agent coated thereon with an appropriate device, such as a doctor knife or a roll coater. The resultant is passed through steam at a fixed temperature and humidity (hereinafter, refered to as "steam treatment"), and a base sheet is piled on the coating layer and the resultant is pressed, for instance, by passing between two rollers having a fixed space or between two rollers to which a fixed pressure is given, and then heated at a fixed temperature (hereinafter, referred to as "heat treatment"). Thereafter, the release paper is peeled off to give an artificial leather having a composite structure comprising the expanded polyurethane layer and the base sheet, which is optionally treated with a surface treating agent. The artificial leather thus obtained has excellent touch, appearance and full-hand similar to that of natural leather and further has excellent softness and surface strength.

The composition comprising as the essential component an urethane prepolymer is prepared by adding a catalyst and a foam stabilizer, and optionally a colorant, filler and other additives, to a liquid urethane prepolymer, which is prepared from a polyol and an organic polyisocyanate in a ratio of the isocyanate group equivalent [NCO] to the hydroxy group equivalent [OH] of 2.0 to 4.0, kneading the mixture and then incorporating an inert gas into the resulting composition which has preferably a viscosity of 70 to 1,000 poise.

The polyol includes polyester polyols and polyether polyols and a mixture thereof, which are liquid at room temperature, said polyester polyols and polyether polyols containing 2 to 4 functional groups (OH group) and having an equivalent weight of 300 to 50,000. Suitable examples of the polyols are as follows:

(i) Liquid polyester polyols obtained by copolyesterifying three or more polycondensable components, i.e. liquid multicomponent polyester polyols produced from (a) two or more polyols, such as straight diols having 2 to 12 carbon atoms (e.g. ethylene glycol, 1,3-propanediol, 1,4-butanediol, 1,5-pentanediol, or 1,6-hexanediol), ether glycols (e.g. diethylene glycol, or triethylene glycol), branched diols having 3 to 12 carbon atoms (e.g. 1,2-propanediol, 1,3-butanediol, neopentyl glycol, or hexylene glycol), and triols having 3 to 12 carbon atoms (e.g. trimethylolethane, trimethylolpropene, or glycerin), and (b) two or more polycarboxylic acids, such as aliphatic dicarboxylic acids (e.g. adipic acid, succinic acid, glutalic acid, pimelic acid, suberic acid, azelaic acid, or sebacic acid), aromatic polycarboxylic acids (e.g. phthalic acid, or trimellitic acid). Suitable combinations of the polyols and the polycarboxylic acids are the combination of butanediol, diethylene glycol and adipic acid; ethylene glycol, 1,4-butanediol and adipic acid; and ethylene glycol, trimethylolpropane, adipic acid and phthalic acid.

(ii) Liquid polyol mixtures comprising a polyester polyol, which is produced from two polycondensable components and is not or almost not liquid, and a polyester polyol, which is produced from another combination of polycondensable components, or a liquid polyester polyol, for instance, a mixture of (a) an aliphatic polyester diol which is solid at room temperature (e.g. polyethylene glycol adipate, polytetramethylene glycol adipate, or polyhexamethylene glycol adipate), (b) a liquid two component polyester polyol, such as a polyester diol obtained from a branched glycol and a dicarboxylic acid (e.g. 1,2-propanediol adipate, 1,3-butanediol adipate, or neopentyl glycol adipate), or a polyester polyol obtained from an ether glycol and a dicarboxylic acid (e.g. diethylene glycol adipate), and/or (c) a liquid polyether polyol. Suitable examples are a polyol mixture of polyethylene glycol adipate and diethylene glycol adipate; and a polyol mixture of a polytetramethylene glycol adipate and a polypropylene glycol.

(iii) Liquid polyol mixtures comprising a monocomponent polyester polyol obtained from a hydroxycarboxylic acid or a lactone thereof and a liquid polyol, for instance, a mixture of (a) a monocomponent polyester polyol obtained from 6-hydroxycaproic acid or $\epsilon$-caprolactone and (b) the liquid polyol mixture of a polyester polyol or polyether polyol as mentioned in the above (ii). Suitable examples are a polyol mixture of a poly($\epsilon$-caprolactone) glycol and a polyether polyol of a glycerin-propylene oxide adduct.

(iv) Liquid polyether polyols, such as polyether polyols (e.g. polytetramethylene glycol, polypropylene glycol, glycerin-propylene oxide adduct, or trimethylolpropane-propylene oxide adduct), chipped polyether polyols wherein an ethylene oxide is added to the terminal, or polyether polyols graft-polymerized with acrylonitrile, which are used alone or in a combination thereof.

The organic isocyanate may be the conventional compounds which are usually used for the preparation of urethane prepolymers. Suitable examples are tolylene diisocyanate, 4,4'-diphenylmethane diisocyanate, xylylene diisocyanate and hexamethylene diisocyanate.

When at least one polyol as mentioned above is reacted with at least one organic polyisocyanate, there can be obtained a liquid urethane prepolymer having an excellent workability. When the urethane prepolymer is prepared by using a polyol mixture, the same urethane prepolymer may be alternatively prepared by preparing separately two urethane prepolymers by using each polyol alone and then mixing together the urethane prepolymers thus obtained.

The catalyst is used for the purpose of promoting the expansion of the urethane prepolymer during the steam treatment and further of promoting the crosslinkage and resinification thereof during the heat treatment. It has been unexpectedly found that it is very important to use a specific combination of certain catalysts for producing the desired artificial leather. Suitable combination of the catalysts comprises an amine catalyst (e.g. N,N,N',N'-tetramethylhexamethylenediamine, N,N-dimethylcyclohexylamine, N,N-dimethylhexylamine, tetramethyl-1,3-butanediamine, N,N,N',N',N'-pentamethyldiethylene-triamine, N,N-dimethylbenzylamine, triethylenediamine, triethylamine, and/or N-methylmorpholine) and a metallic catalyst, such as tin, cobalt, iron, zinc and lead containing catalysts, preferably, tin catalysts, such as dibutyl tin laurate, stannous octate, Marukure UL-1 (a trade name of a tin catalyst, made by Argus Co.). The amine catalyst and the metallic catalyst are used in an amount of 0.01 to 10 parts by weight, preferably 0.02 to 5 parts by weight, and 0.05 to 10 parts by weight, preferably 0.1 to 5 parts by weight, respectively, to 100 parts by weight of the urethane prepolymer. By using the specific combination of the catalysts, the reaction is divided into two stages: the steam treatment and the heat treatment, and thereby the desired artificial leather having constant properties can be efficiently produced.

The foam stabilizer may be commercially available silicon compounds (e.g. siloxane-oxyalkylene copolymers which are on market in the trade name of SH-192 and SH-194 (by Toray Silicon K.K.) and L-540, L-544, L-532 and L-5350 (by Nippon Unicar K.K.) and is used in an amount of 0.1 to 5 parts by weight to 100 parts by weight of the urethane prepolymer.

In the process of the present invention, an inert gas is incorporated into the composition, by which plenty of extremely fine foams (cells) are included in the composition and further the foaming layer formed by the subsequent steam treatment has an extremely fine foam structure. In the so-called "one-shot process", the size of the foams in the foaming layer can be controlled by changing the ring bore or the shape of the outlet of the agitating and mixing vessel, controlling the reaction of the polyol and the isocyanate, or using an appropriate foam stabilizer. However, in the process, wherein a composition is coated on a release paper and the coating layer is expanded by the steam treatment, as in the present invention, it is very difficult to control the size of the foams by an external means, and it is necessary to have a plenty of extremely fine cells of an inert gas included within the compound. The inert gas includes nitrogen gas, fluorohydrocarbon gases (e.g. Freon: a trade name of the product made by Du Pont), dried air, or the like. The inert gas is included in the composition in the form of extremely fine cells having an average diameter of not more than 1/10 mm, preferably from 1/50 mm to 1/100 mm. Thus, by incorporating plenty of the extremely fine cells of the inert gas into the composition, which shows a turbid appearance, the foaming layer having the desired density and size of the forms can be formed by the subsequent steam treatment, and thereby the desired artificial leather having similar properties to those of the natural leather can be produced.

The composition including plenty of extremely fine cells of the inert gas is then coated onto a release paper or a layer of the surface treating agent coated on a release paper in a thickness of 0.03 to 0.5 mm, preferably 0.05 to 0.4 mm. The thickness of the coating layer within this range is very important for carrying out uniformly the expansion reaction in the subsequent steam treatment and further for giving the foaming layer having uniform properties.

In the present invention, the reaction is divided into two stages, i.e. the steam treatment and the heat treatment.

In the first stage, the composition coated onto a release paper is subjected to the steam treatment prior to the laminating of the base sheet, and thereby the foaming and the resinification of the coating layer proceed well. The steam treatment is carried out at a temperature of 40° to 95° C and at a humidity of 60% or more, preferably 80 to 95%, until the coating layer becomes semi-solid by resinification thereof, so that the number of the foams in the coating layer becomes 5,000 forms/inch$^2$ or more, preferably 10,000 forms/inch$^2$ or more and the density of the coating layer becomes 80 – 700 g/liter. The time for the steam treatment may vary with the amount of the isocyanate contained in the urethane prepolymer, the kind and amount of the catalysts, and the conditions of the steam treatment, but may be usually from 15 seconds to 2 minutes, by which the semi-solid foaming layer having a tacky surface is formed.

In the second stage, a base sheet is laminated onto the coating layer thus treated, and the resultant is subjected to the heat treatment.

The base sheet is not limited to a specific sheet, but may be, for instance, the commercially available, raised or normal, woven or knitted fabrics, non-woven fabrics, or these fabrics penetrated with a synthetic resin. The laminating is done under a pressure so that the thickness of the coating layer becomes 0.95 to 0.4 time of that before the laminating. The control of the laminating conditions is effective for the surface strength of the product, the adhesion strength between the coating layer and the base sheet, the soft hand of the product, and further the occurrence of small puckering. The laminating is usually performed by passing between two rollers having a fixed space or between two rollers to which a fixed pressure is given, but may be done by any other method.

After the laminating of the base sheet, the coating layer is further subjected to the heat treatment at a temperature of 90° to 180° C, by which the foaming layer is completely resinified. According to this process, it is not required to subject to the aging step for a long time which is required for completing the reaction in the conventional process. The time for the heat treatment may vary with the amount of the isocayanate contained in the urethane prepolymer, the kind and amount of the catalysts, the degree of the steam treatment and the conditions of the heat treatment, but may be usually from about 1 to about 7 minutes.

In the present invention, the use of the release paper coated with a surface treating agent or the treatment of the product with a surface treating agent can give the artificial leather having more excellent color shade, brightness and touch. The surface treating agent include conventional urethane resins, amino acid resins, polyamide resins, polycarbonate resins, nitrocellulose, acrylic resin, which may be used alone or in a combination thereof.

The present invention is illustrated by the following Examples but is not limited thereto.

EXAMPLE 1

A polyester diol (molecular weight: 1,120, 68.6 parts by weight), which is produced from ethylene glycol, 1,4-butanediol and adipic acid, is mixed with tolylene diisocyanate ([NCO] : [OH] = 2.94, 31.4 parts by weight). The mixture is heated with agitation at 85° C for 2 hours to give an urethane prepolymer. To the urethane prepolymer (100 parts by weight) are added a silicon compound (1 part by weight, as the foam stabilizer), N,N,N',N'-tetramethylhexamethylenediamine (0.1 part by weight, as the catalyst) and stannous octate (0.3 part by weight, as the catalyst). Into the mixture is incorporated nitrogen gas with agitation to give a composition wherein a plenty of extremely fine cells of nitrogen gas having an average diameter of 1/50 mm – 1/100 mm are incorporated.

Onto a layer of an urethane resin (a surface treating agent) coated on a release paper is coated the composition obtained above in a thickness of about 0.2 mm. The resultant is kept under an atmosphere of a temperature of 50° C and a humidity of 90% for 90 seconds, by which the foaming and polymerizing reactions proceed to give an expanded intermediate having an enough dry tank and a density of about 430 g/liter.

Thereafter, a cotton cloth (No. 3010) is immediately piled on the coating layer of the above intermediate and the resultant is pressed by passing between two rollers having a space of 1.2 mm, by which the coating layer becomes about 0.8 times of that before the laminating of the base sheet. The resultant is heated at 130° C for 5 minutes in a drier to further the reaction. When the coating layer is solidified completely, the release paper is peeled off to give an artificial leather having excellent touch and full-hand similar to those of the natural leather and having excellent surface strength and flexing resistance.

EXAMPLE 2

A polyester diol (molecular weight: 2,000, 76.7 parts by weight), which is produced from ethylene glycol, 1,4-butanediol and adipic acid, is mixed with tolylene diisocyanate ([NCO] : [OH] = 3.50, 23.3 parts by weight). The mixture is heated with agitation at 85° C for 2 hours to give a urethane prepolymer. To the urethane prepolymer (100 parts by weight) are added a silicon compound (1.0 part by weight), triethylenediamine (0.07 part by weight), stannous octoate (0.3 part by weight) and a pigment (a paste of carbon black/dioctyl phthalate = 1/4, 5 parts by weight). Into the mixture is incorporated dried air in the same manner as in Example 1 to give a composition.

Onto a layer of an amino acid resin (a surface treating agent) coated on a release paper is coated the composition obtained above in a thickness of about 0.18 mm. The resultant is kept under an atmosphere of a temperature of 60° C and a humidity of 95% for 30 seconds, by which the foaming and polymerizing reactions proceed to give an expanded intermediate having an enough tacky surface and a density of about 460 g/liter. Thereafter, a knitted cotton cloth is laminated onto the coating layer of the above intermediate in the same manner as described in Example 1, i.e. by passing through between two rollers so that the coating layer becomes about 0.9 times that before the laminating of the base sheet. The resultant is heated in a drier of 140° C for 3 minutes to further the reaction. When the coating layer is solidified completely, the release paper is peeled off to give an artificial leather having excellent appearance and toughness similar to those of natural leather and having an excellent softness.

EXAMPLE 3

A mixture of a polyether triol (molecular weight: 1,000, 14.53 parts by weight), which is produced from glycerin and propylene oxide, a polyether diol (molecular weight: 1,000, 41.30 parts by weight), which is produced from ethylene glycol and propylene oxide, and tolylene diisocyanate ([NCO] : [OH] = 3.01, 32.7 parts by weight) is heated with agitation at 85° C for 2 hours to give a urethane prepolymer. To the urethane prepolymer (100 parts by weight) thus prepared are added a silicon compound (1.0 part by weight), tetramethylhexamethylenediamine (0.1 part by weight) and stannous octate (0.3 part by weight). Into the mixture is incorporated dried air in the same manner as in Example 1 to give a composition.

Onto a layer of a urethane resin coated on a release paper is coated the composition obtained above in a thickness of about 0.15 mm. The resultant is kept under an atmosphere of a temperature of 50° C and a humidity of 90% for 60 seconds, by which the foaming and polymerizing reactions proceed to give an expanded intermediate having an enough dry tack and a density of about 430 g/liter. Thereafter, on the coating layer of the above intermediate is immediately piled a sheet of a non-woven fiber having a thickness of 0.8 mm, wherein a polyurethane elastomer is impregnated and solidified and the resultant is pressed by passing between two rollers so that the coating layer becomes about 0.5 times that before the laminating of the base sheet, in the same manner as described in Example 1. The resultant is heated in a drier of 130° C for 5 minutes to further the reaction. When the coating layer is solidified completely, the release paper is peeled off. The surface thereof is printed with an ink consisting of a urethane resin and a pigment to give an artificial leather having an excellent appearance and an excellent strength similar to those of natural leather.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for producing an artificial leather, which comprises coating a composition, comprising as the essential component, a urethane prepolymer prepared from a polyol and an organic polyisocyanate in a ratio of the isocyanate group equivalent [NCO] to the hydroxy group equivalent [OH] of 2.0 to 4.0, a combination of an amine catalyst and a metallic catalyst and a foam stabilizer and including a plurality of extremely fine cells of an inert gas, onto a release paper in a thickness of 0.03 to 0.5 mm; expanding and resinifying the resultant under an atmosphere of a temperature of 40° to 95° C and a humidity of 60% or more until the coating layer becomes semisolid so that the number of the foams in the coating layer becomes 5,000 foams/inch$^2$ or more and the density of the coating layer becomes 80 - 700 g/liter; laminating a base sheet onto the coating layer under a pressure so that the thickness of the coating layer becomes about 0.95 to 0.4 times that before the laminating of the base sheet; heating the laminated product at a temperature of 90° to 180° C, and then peeling off the release paper.

2. The process according to claim 1, wherein the amine catalyst and the metallic catalyst are used in an amount of 0.01 to 10 parts by weight and 0.05 to 10 parts by weight, respectively, to 100 parts by weight of the urethane prepolymer.

3. The process according to claim 2, wherein the amine catalyst and the metallic catalyst are used in an amount of 0.02 to 5 parts by weight and 0.1 to 5 parts by weight, respectively, to 100 parts by weight of the urethane prepolymer.

4. The process according to claim 1, wherein the foam stabilizer is a silicon compound.

5. The process according to claim 1, wherein the composition is coated onto the release paper in a thickness of 0.05 to 0.4 mm.

6. The process according to claim 1, wherein the composition includes the fine cells of the inert gas having an average diameter of not more than 1/10 mm.

7. The process according to claim 6, wherein the fine cells of the inert gas has an average diameter of from 1/50 to 1/100 mm.

8. The process according to claim 1, wherein the release paper is previously coated with a surface treating agent and the composition is coated onto the layer of the surface treating agent coated on the release paper.

9. The process according to claim 1, wherein the amine catalyst is selected from the group consisting of N,N,N',N'-tetramethylhexamethylenediamine, N,N-dimethylcyclohexylamine, N,N-dimethylhexylamine, tetramethyl-1,3-butanediamine, N,N,N',N',N'-pentamethyldiethylene-triamine, N,N-dimethylbenzylamine, triethylenediamine, triethylamine, and/or N-methylmorpholine and the metallic catalyst is selected from the group consisting of tin, cobalt, iron, zinc and lead containing catalysts.

10. The process according to claim 9, wherein the tin-containing catalyst is dibutyl tin laurate or stannous octoate.

* * * * *